Sept. 16, 1958 F. O. NOTTINGHAM, JR 2,851,882
FLUID METER CORRECTION FACTOR AND TOTALIZING SYSTEM
Filed July 9, 1954 3 Sheets-Sheet 1

INVENTOR
Frank O. Nottingham, Jr.

BY Stevens, Davis, Miller and Mosher
ATTORNEYS

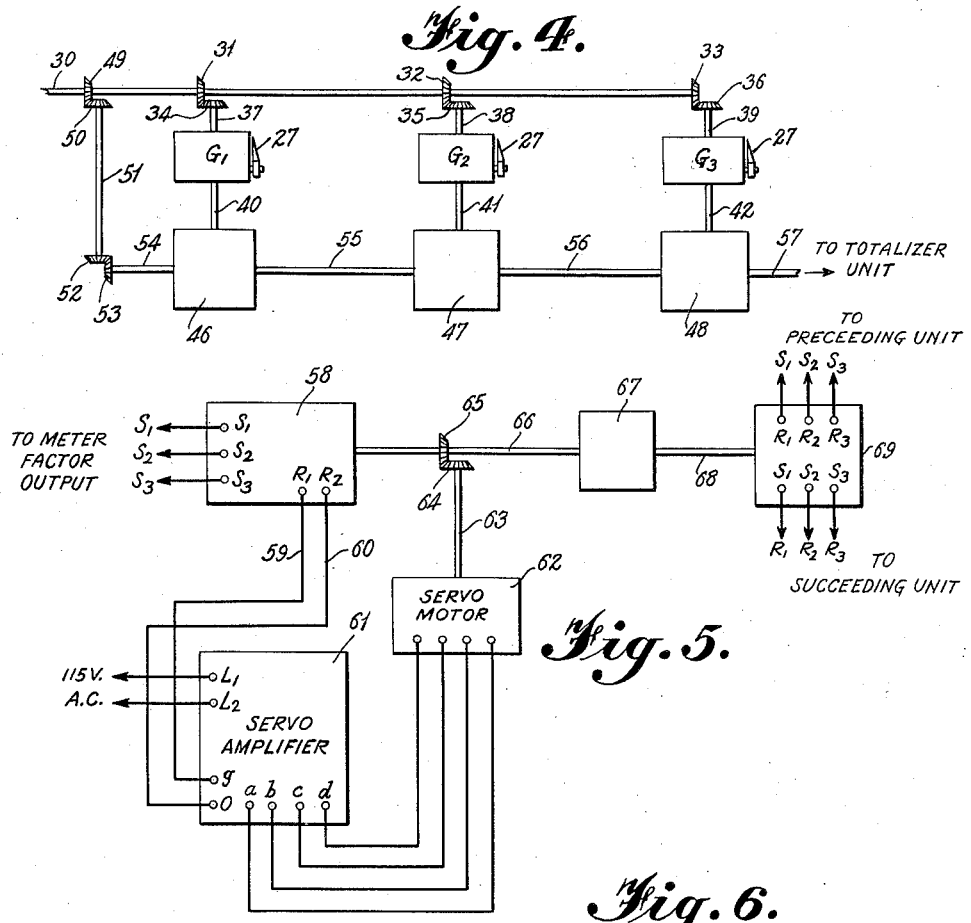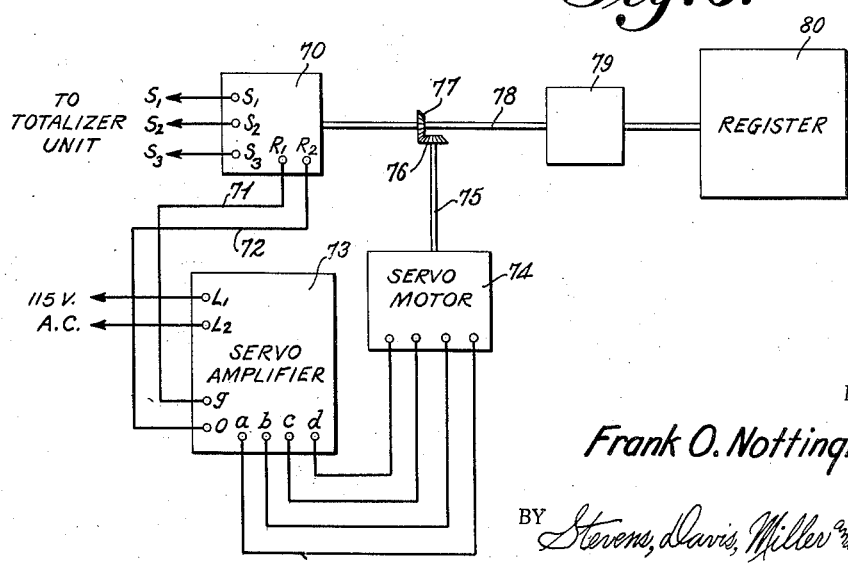

Sept. 16, 1958     F. O. NOTTINGHAM, JR     2,851,882
FLUID METER CORRECTION FACTOR AND TOTALIZING SYSTEM
Filed July 9, 1954     3 Sheets-Sheet 3
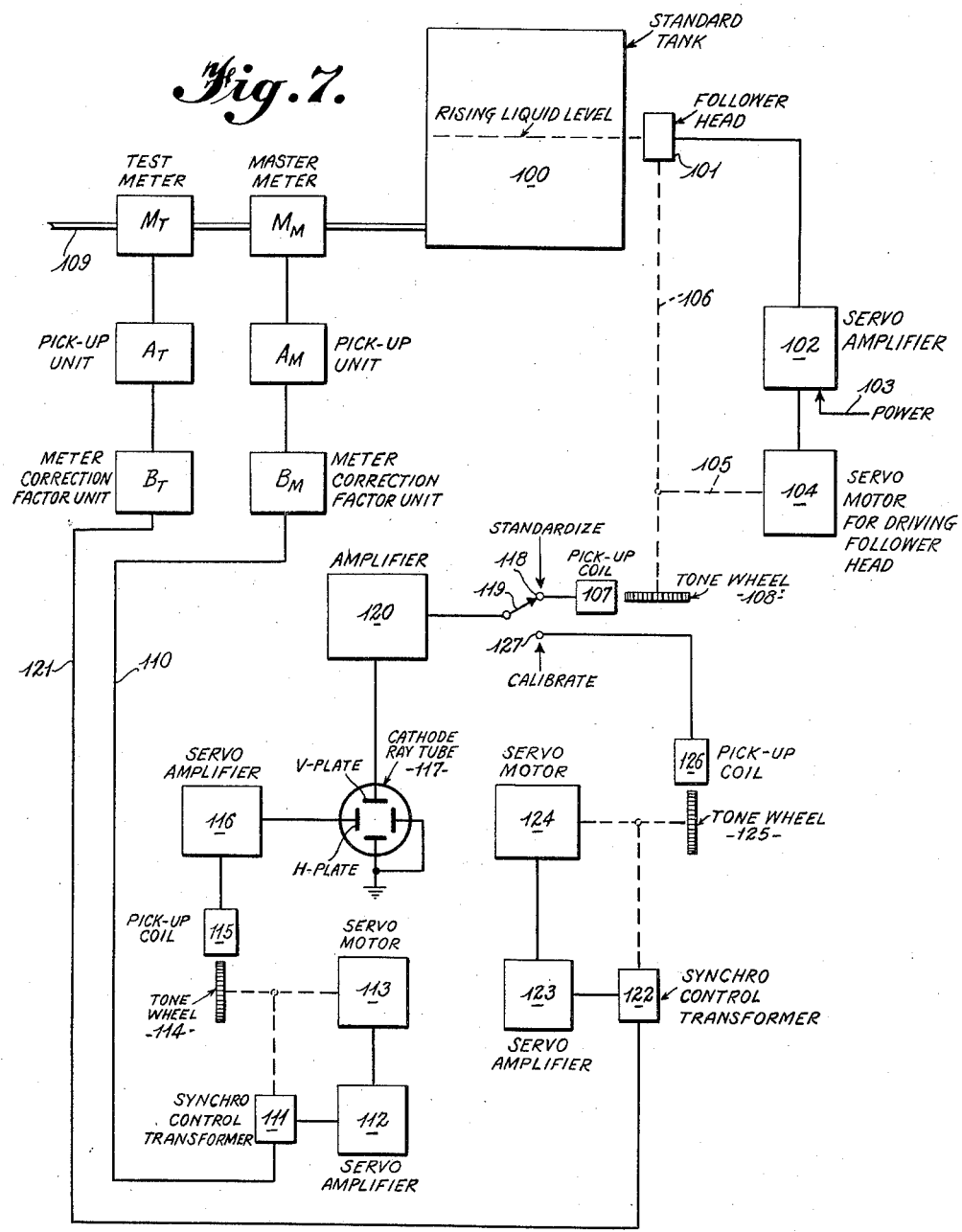
INVENTOR
Frank O. Nottingham, Jr.

Н

United States Patent Office 2,851,882
Patented Sept. 16, 1958

---

2,851,882

FLUID METER CORRECTION FACTOR AND TOTALIZING SYSTEM

Frank O. Nottingham, Jr., Fulton County, Ga., assignor to Plantation Pipe Line Company, a corporation of Delaware Application July 9, 1954, Serial No. 442,325

7 Claims. (Cl. 73—195)

This invention relates to a novel totalizing system for a set or bank of fluid meters which includes a unique arrangement for independently correcting each component fluid meter for inaccuracies and also for calibrating each meter.

The registration of a fluid meter from the standpoint of accuracy, even of the positive displacement type, is dependent upon many factors. For example, it is recognized that the viscosity and density of the fluid to be metered affects the accuracy of the meter. This is so because of the mechanical clearance necessary for moving parts of the meter and the possibility of slippage of fluid through these clearances. Thus it has been found that a fluid meter designed for one set of conditions, i. e., temperature, pressure, etc., regarding a particular fluid will have satisfactory and accurate results under the given or designed set of conditions but when the same meter is used to record the flow of a different set of conditions other than the design set of conditions, its accuracy may be highly unsatisfactory. In addition to the constant changing of the fluid conditions being metered, there is also the consideration of mechanical wear of the moving parts due to friction. This wearing of the meter parts will also cause a variation in the accuracy of the meter unless special provision is made to correct for these factors.

Accordingly, it is an object of the present invention to provide a totalizing system for a bank of meters, in which means are provided for applying a definite and adjustable correction to each fluid meter.

It is a further object of the present invention to provide a correction and totalizing system operated in part with servo mechanisms which will be more efficient and accurate than any totalizing system heretofore available.

It is a still further object of the present invention to provide a novel correction and totalizing system for a bank of fluid meters which will be economical to install, easy to operate, and which can be readily adjusted to operate with requisite accuracy under all conditions of operation.

Other and further objects of the present invention will become more fully apparent from the following detailed description, when taken in conjunction with the appended drawings, in which:

Figure 4 is a schematic showing of a modified arrangement for the meter correction factor unit;

Figure 5 is a schematic diagram showing the totalizer unit associated with each meter of the bank;

Figure 6 is a schematic diagram illustrating the totalized register unit for all of the fluid meters in the bank; and Figure 7 is a schematic representation of the calibration of a meter according to the present invention.

Figure 1:
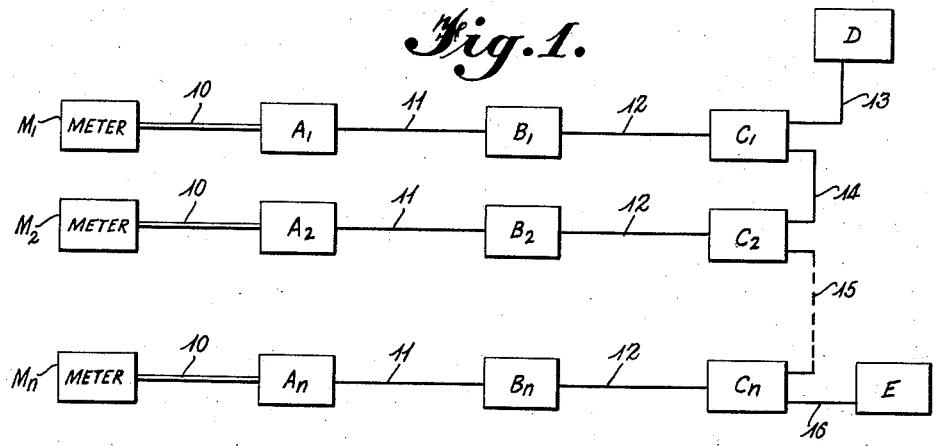
Figure 1 is a block diagram showing the system of the present invention.

Referring now to the drawings, and in particular to Figure 1, there is shown or illustrated a block diagram of the system of the present invention. As illustrated, a plurality of meters identified by the letters M1, M2 and Mn are individually associated with pickup units identified by the letters A1, A2 and An. A takeoff shaft 10 leads from each meter to its respective pickup unit. It is by this means that the mechanical rotation of the meter is reproduced in the respective pickup unit associated with the meter. Basically, the pickup unit for each fluid meter consists of a gear train and a servo generator unit for the purpose of translating the mechanical rotation of the meter into a corresponding electrical signal. The electrical output from each pickup unit is fed to a meter correction factor unit associated with each said pickup unit. The meter correction factor units are identified in Figure 1 by the letters B1, B2 and Bn. The electrical connection between the pickup unit and the meter correction factor unit is designated by the lead 11. Each meter correction factor unit consists essentially of a synchro control transformer, a servo amplifier, a servomotor for driving the unit at the exact speed of the motor, and a means for imposing a correction upon the speed of the meter. This correction means consists essentially of a three-dial gear train and three synchro differentials for the purpose of adding the three correction components introduced by the three-dial gear train. The output from each of the meter correction factor units B is fed by means of line 12 to a totalizer unit associated with each one of the meter correction factor units. These totalizer units are identified in Figure 1 by the leters C1, C2 and Cn. Each totalizer unit consists basically of a synchro control transformer, servo amplifier, servomotor, fixed gear train and a synchro differential. Each totalizer unit is operated at the corrected speed of its respective meter as received from the meter correction factor unit. This corrected speed is reduced in the totalizer unit by a given definite factor. Thereafter the signal is fed to the synchro differential of the totalizer unit and the outputs from the several totalizer units are combined vertically through the use of the synchro differentials.

A small transformer identified by the letter D is employed to supply the driving signal for the synchro differentials of the several totalizer units. The signal from the transformer D is fed to the first totalizer unit C1 by the line 13. The output signals from the several totalizer units are added vertically by passing the signals successively through the synchro differentials of the units as indicated by the lines 14 and the dotted line 15 between the units C2 and Cn. The final totalized signal at the output of the synchro differential in the totalizer unit Cn is fed by means of line 16 to the totalized register unit E. The totalized register unit E consists of a synchro control transformer, servo amplifier, servomotor and suitable gears to drive any type register, as for instance, a conventional standard printing register.

The selection of a system employing servo mechanisms is highly desirable in the attainment of the result, since the servo mechanisms will faithfully reproduce the motion of the fluid meter and will run at the correct speed or will stop completely. In addition to this, and of equal importance, is the fact that the servo mechanism will place a constant and very light load on the meter. Because the system is of the continuous motion type, or analog type, rather than pulse type, the system will be amenable to multiplication by the correction factor in the meter correction factor units B1 to Bn with great ease.

From Figure 1 and the foregoing description pertaining thereto, it will be apparent that the number of meters that can be incorporated into the system of the present invention is unlimited. Hence the last meter has been designated as Mn, wherein n is accorded its ordinary mathematical meaning of an unknown integer, the selection of which is determined wholly by the total number of meters to be used in a given system. The invention in this regard is flexible and has been purposely made so to accommodate any and all installations. Also, line 15 has been shown as dotted to indicate interposing from 0 to n additional meters and their associated components.

The construction and operation of each meter M and the components associated therewith, namely, pickup unit A, meter correction factor unit B and totalizer unit C, are the same for all, and hence a description of one will suffice to enable a full and complete understanding of the invention. Thus for the purpose of reducing the description to only that which is essential, the ensuing material will deal only with meter M1, pickup unit A1, meter correction factor B1 and totalizer unit C1 specifically, and with all other meters and their associated components in a generic sense.

Figure 2:
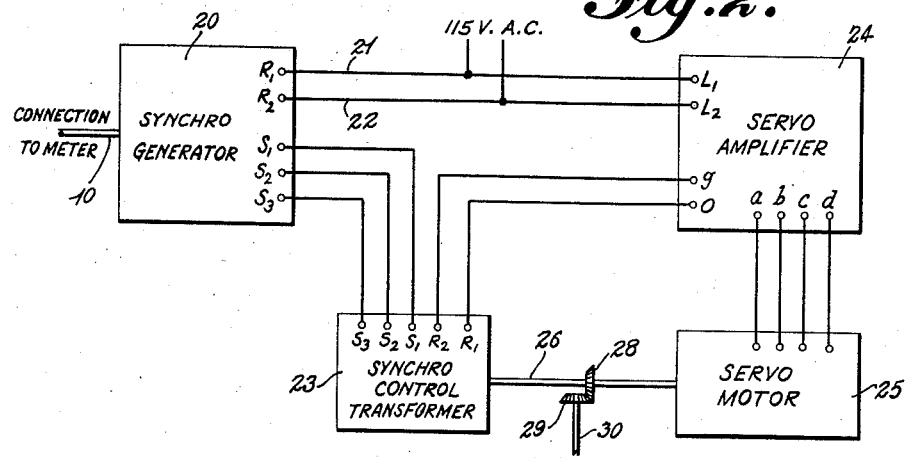
Figure 2 is a schematic diagram showing the pickup unit and part of the meter correction unit associated with each meter.

Referring to Figure 2, there will now be described pickup unit A1 and a portion of the meter correction factor unit B1. As shown in Figure 2, a mechanical shaft 10 connects the operating part of the meter M1 with the rotor of synchro generator 20 through a gear having a speed ratio of 1 to 4 in this case. This means that the synchro generator runs four times as fast as the meter thus increasing the accuracy of the system. It should be noted here that any practical speed step-up could also be used for the same reason. The synchro generator, thus driven by the fluid meter, produces in response to meter motion a three-phase pattern of modulated voltages from its S1, S2 and S3 stator terminals. Power to operate the synchro generator 20 is supplied from a 115 volt alternating current source, as indicated in Figure 2, through lines 21 and 22 to the rotor terminals R1 and R2 of the synchro generator 20. The synchro control transformer 23 of the B1 unit receives the modulated voltages from the synchro generator 20 at its S1, S2 and S3 stator terminals and delivers from its rotor terminals R1 and R2 a voltage proportional to the sine of the difference in shaft angles of synchro generator 20 and synchro control transformer 23. The servo amplifier 24 of the B1 unit receives the voltages appearing at the R1 and R2 rotor terminals of the synchro control transformer 23 at its terminals g and o. Additionally, the servo amplifier 24 is supplied with power to its L1 and L2 terminals by means of the 115 volt alternating current source through the lines 21 and 22. The synchro control transformer 23 is arranged so that when the angular difference between its shaft and the synchro generator shaft is zero, no voltage will appear at the R1 and R2 terminals of the synchro control transformer 23. The servo amplifier 24 delivers a quarter phase system of voltages from its terminals indicated by the letters a, b, c and d. The voltage fed through or from terminals a and b is maintained constant and is utilized as the reference voltage, while the voltage fed from terminals c and d is proportional to the voltage signal received from the R1 and R2 terminals of the synchro control transformer 23. The phase sequence of these voltages fed from terminals a, b, c and d, and hence rotation of servomotor 25 to which this system of voltages is fed, depends upon the relative shaft positions of the synchro generator 20 and the synchro control transformer 23. In the normal operation when the system is connected properly, the synchro generator shaft will lead the control transformer shaft by a constant angle which is just sufficient to give the necessary servo amplifier input to enable motor 25 to drive its load at the same speed as the synchro generator 20 is being driven by meter M1.

Figure 3:
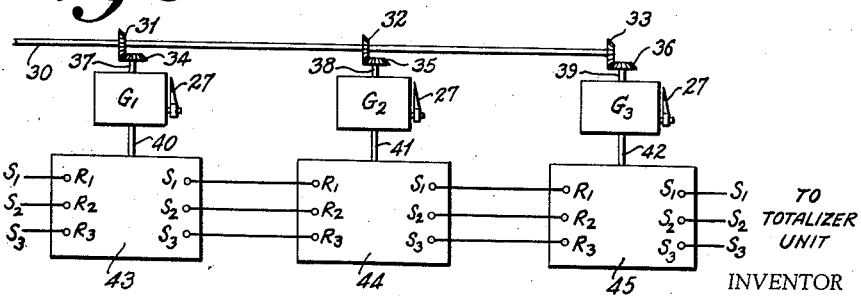
Figure 3 is a schematic showing of the remaining part of the meter correction factor unit.

Considering now Figure 3, and in particular the apparatus employed to apply the correction to the shaft speed to compensate for wearing of the meter and other factors which affect meter operation, as, for example, viscosity and temperature, etc., the apparatus consists essentially of three sets of gear trains G1, G2 and G3. Each gear train G operates with a different degree of fineness and each is adapted for adjustment within a given range. Selection of a gear train setting is by means of a dial 27 which can be operated manually if desired in order to change the setting of the gear train, or automatically, as will be appreciated. Referring back briefly to Figure 2, a bevel gear is fixed to output shaft 26 of motor 25. This bevel gear 28 is in meshing engagement with a bevel gear 29 located at the end of a shaft 30. The shaft 26, as will be noted, is connected to the rotor of synchro control transformer 23 to furnish the follow-up feature of the servo system. It is this shaft 30 which supplies the mechanical signal simulating the rotation of the fluid meter shaft to the three gear trains G. Referring again to Figure 3, this is accomplished by means of bevel gears 31, 32 and 33 fixed to the shaft 30 and in meshing engagement with bevel gears 34, 35 and 36 respectively, mounted to the ends of shafts 37, 38 and 39 respectively, which feed to the three gear trains. In passing through the three gear trains G1, G2 and G3, the shaft speed is corrected with varying degrees of fineness so that the shaft output speed from each of the gear trains, namely, the shafts 40, 41 and 42 respectively, are each running at a different speed from the meter shaft speed by a factor determined by the setting of the gear trains G1, G2 and G3. These shafts 40, 41 and 42 feed to synchro differential units 43, 44 and 45 and drive the rotors of these synchro differentials. An electrical voltage pattern corresponding exactly to the shaft speed of the fluid meter is introduced into the first synchro differential unit 43. Such an electrical pattern of voltages may be derived, as shown in drawings, from the stator terminals S1, S2 and S3 of the synchro generator unit 20 of the A1 unit. This pattern of voltages is introduced into the synchro differential unit 43 and impressed upon its R1, R2 and R3 rotor terminals. Synchro differential 43 has the ability to take the pattern of voltages received at its rotor terminals R1, R2 and R3 and alter it in accordance with the speed of its shaft rotation to produce at its stator terminals S1, S2 and S3 a pattern of voltages corresponding to the resultant algebraic sum of the shaft speed of the synchro differential and the shaft speed represented by the voltage pattern impressed on the R1, R2 and R3 rotor terminals of the synchro differential, this latter voltage pattern being derived from synchro generator 20 and corresponding to shaft speed of meter M1. The output voltage pattern from synchro differential 43 is impressed on the rotor terminals R1, R2 and R3 of synchro differential 44 and compared with the shaft rotation of synchro differential 44. As before, the resultant appears as a voltage pattern at the stator terminals S1, S2 and S3 of synchro differential 44. The signal is passed to the third synchro differential 45, wherein the operation is repeated, and the final output appears at the stator terminals S1, S2 and S3 of the synchro differential 45. The modulation speed of the final pattern of voltages is the corrected speed for meter M1 to compensate for inaccuracies in meter operation due to wear and friction factors and also to characteristics of the fluid handled.

Summing up the operation of the apparatus shown in Figure 3, the meter correction factor unit consists of three sets of gear trains, G1, G2 and G3, which are driven from the shaft of the servomotor 25 through the medium of bevel gears 28 and 29, shaft 30, etc. The output shaft of each of the three sets of gear trains derives a synchro differential. This synchro differential has the ability to take a system of modulated voltages from the synchro generator 20 of the A1 unit and alter it in accordance with its shaft rotation. For instance, let the speed of the synchro generator shaft be N1 and the speed of the synchro differential unit 43 be N2. If the connections between these units are properly made, the output of the synchro differential unit 43 will be a pattern of voltages appearing at its S1, S2 and S3 stator terminals, whose modulation speed will be $N1+N2$. It follows that if the sense of N2 is reversed, then the resultant output speed, as indicated by the pattern of voltages appearing at the stator terminals S1, S2 and S3 of the synchro differential unit 43, will be $N1-N2$. As shown, three synchro differentials are used to add and subtract components of a pattern of voltages to attain a desirable degree of fineness.

In order to furnish a still more specific illustration of the operation of the apparatus shown in Figure 3, the gear train G1 has ratios of from $-0.05$ to $+0.04$ in steps of 0.01 which can be effected through manipulation of the dial 27 on the side of the gear train G1 in the manner previously described. The gear train G2 has ratios of 0.000 to 0.009 in steps of 0.001 which, as in the case of gear train G1, can be effected through manipulation of the dial 27. The gear train G3 is arranged with ratios of from 0.0000 to 0.0009 in steps of 0.0001, which steps are effected by manipulation of the dial 27 on the side of gear train G3. By means of these specific gear train ratios it is possible, since the synchro differential units 43, 44 and 45 are arranged in cascading fashion, to produce a modulation speed output in the form of a voltage pattern from the stator terminals S1, S2 and S3 of the synchro differential unit 45, giving a range of corrected speed to the meter shaft of the fluid meter M1 of from 0.950 to 1.0499 of the fluid meter shaft.

As will be evident from the above, the gear trains G1, G2 and G3 provide three decade ranges whereby it is possible to obtain any correction factor desired in the range of 0.950 to 1.0499 easily and quickly by properly setting the dials 27 associated with each gear train. It will be appreciated, however, that the correction factor range, although preferred, can be increased or diminished to meet the needs or requirements of a particular system, such as by increasing or decreasing the ratios of gear train G1 for wider or narrower ranges, or adding another gear train and synchro differential for each additional decade or decimal place of fineness desired. Because the servo pickup unit A1 is mechanically divorced from the meter correction factor unit B1, there will be a constant light load on the meter M1 and the meter M1 will not be subject to a changeable load which would tend to affect detrimentally the operation of the system.

A modified arrangement to be utilized in place of the arrangement shown and described with reference to Figure 3 is shown in Figure 4. Here there is illustrated a system for compensating the fluid meter shaft speed for the various factors involved which tend to produce errors in the fluid meter shaft speed. The arrangement employs the use of mechanical differentials in place of synchro differentials. As in the apparatus shown in Figure 3, the output from the servo motor 25 is fed by means of shaft 30 to the three sets of gear trains. A bevel gear 49 is fixed to the shaft 30 in meshing engagement with a bevel gear 50 attached and fixed to the end of a shaft 51. At the other end of shaft 51 is a bevel gear 52 in meshing engagement with a bevel gear 53 attached to and fixed to the end of shaft 54 leading into the first mechanical differential unit 46. It is by this means that the speed of the shaft of the servomotor 25, which duplicates the speed of the meter shaft, is introduced into the first mechanical differential unit 46. The speed of shaft 40 from the first gear train G1 is added algebraically to the speed of shaft 54 in the first mechanical differential unit 46. The speed of shaft 55, which is the output of mechanical differential unit 46, is fed into the second mechanical differential unit 47. The speed of shaft 41 from the second gear train G2 is added algebraically to the speed of shaft 55 by the second mechanical differential unit 47 to give the speed of shaft 56 which is the output shaft of the second mechanical differential unit 47 and the input shaft of the third mechanical differential 48. The speed of shaft 42 from the third gear train G3 is added algebraically to the speed of shaft 56 in the third mechanical differential unit 48 to give the speed of shaft 57 which is the output shaft of the third mechanical differential unit 48. The speed of shaft 57 is then the corrected speed of the meter as has been previously described. Output shaft 57 may be connected to a suitable totalizer unit. One means of accomplishing this is to connect shaft 57 through a speed changing gear set 67 to shaft 68 to a totalizing synchro differential 69, see in this regard Figure 5. The reason for gear set 67 is to reduce the running speed of synchro differential 69 such that the totalized speeds of the several differentials will not drive register 80 at an excessive speed and also to provide a suitable multiplier for register 80. One example of such a ratio is 10 to 1 so that synchro differential 69 runs at one-tenth corrected speed and thus the reading of register 80 must be multiplied by 10 to give the corrected registration.

Also a synchro generator can be connected to be driven by shaft 57 to put out an electrical signal in the form of a three phase pattern of voltages which will correspond to the corrected speed of meter M1. This pattern of voltages can be used for calibration purposes.

Referring now to Figure 5, a description of the C1 unit will be given. The output from the meter correction factor unit B1, as illustrated in Figures 2 and 3, is in the form of a pattern of voltages appearing at the stator terminals S1, S2 and S3 of the third and last synchro differential 45. This voltage pattern is fed to a synchro control transformer 58 and impressed upon its stator terminals S1, S2 and S3. A voltage signal appears at the R1 and R2 rotor terminals of the synchro control transformer 58 and is taken by means of leads 59 and 60 to the terminals $g$ and $o$ of a servo amplifier 61. The power for the servo amplifier 61 is supplied to the terminals L1 and L2 from a suitable 115 volt alternating current source. As in the case of the description of the apparatus shown in Figure 2 with respect to servo amplifier 24, the servo amplifier 61 produces a quarter phase system of voltages appearing at its $a$, $b$, $c$ and $d$ terminals. The voltage across the $a$ and $b$ terminals is constant and is utilized as a standard. The voltages across the $c$ and $d$ terminals are proportional to the voltage signal received from the synchro control transformer 58 that appeared on its R1 and R2 rotor terminals. The quarter phase system of voltages is fed by suitable means to a servomotor 62, wherein a shaft rotation is produced corresponding to the modulation speed of the pattern of voltages fed to the control transformer 58, and this speed will be the corrected shaft speed for the shaft of the fluid meter. The output shaft 63 from the servomotor 62 at its end is arranged with a bevel gear 64 in meshing engagement with a bevel gear 65 fixed to a shaft 66. The shaft 66 feeds back to the control transformer 58 to supply the follow-up feature of the servo system and, in addition, feeds to a gear train 67 having a fixed ratio.

The gear train 67 has a fixed ratio, such as 10 to 1, in order to reduce the rotational speed of the shaft 66 as it passes therethrough. Output shaft 68 leads from gear train 67 to a synchro differential 69. As mentioned, the ratio for the gear train 67 may be in the order of 10 to 1, and hence the shaft 68 rotates at one-tenth the speed of the shaft 66. Referring briefly to Figure 1, it will be noted that each C unit associated with each meter M is provided with a similar synchro differential as the synchro differential 69. The synchro differential units are arranged vertically in a cascaded manner by leads 14 and 15 in order to totalize the output signals from the meters. The operation of synchro differential unit 69 in the C1 unit is the same as the operation of the synchro differential units 43, 44 and 45 of the meter correction factor unit. Thus shaft 68 introduces a rotational movement into the synchro differential unit 69 which is compared with a pattern of voltages representing a modulated shaft speed received from the preceding synchro differential unit located in the preceding C unit. The pattern of voltages is impressed upon the rotor terminals R1, R2 and R3 of the synchro differential unit 69 and in the unit this pattern is altered in accordance with the rotor speed of the unit induced by the shaft 68 with an output pattern of voltages appearing across the stator terminals S1, S2 and S3 of the unit 69. As in the case of differential units 43—45, the output pattern of voltages corresponds with a modulated shaft speed which is the resultant or differential of the speed of shaft 68 and the modulated speed represented by the input pattern of voltages. The output pattern of voltages appearing on the stator terminals of unit 69 is fed to the next successive C unit to the rotor terminals of the synchro differential of that C unit. The speeds of the several meters M are totalized in this fashion to the last C unit (Cn) from which an output pattern of voltages is derived from the stator terminals of the synchro differential of the Cn unit representing the totalized meter readings.

The voltage pattern from the Cn unit is fed to a synchro control transformer 70 located in the totalized register unit E. As in the case of all the synchro control transformers, a voltage appears at the rotor terminals R1 and R2 of the synchro control transformer 70 and this voltage is fed by means of lines 71 and 72 to the g and o terminals of a servo amplifier 73. The power necessary to drive the servo amplifier 73 is derived from a suitable 115 volt alternating current source which is impressed upon the servo amplifier 73 at its terminals L1 and L2. As before with all other servo amplifiers in the system, a quarter phase voltage system is developed across the a, b, c and d terminals of the servo amplifier 73. The voltage across the terminals a and b is constant and is utilized as the reference voltage, whereas the voltage developed across the terminals c and d is proportional to the voltage impressed on the servo amplifier on its terminals g and o. This quarter phase voltage system is fed to a servomotor 74 by means of suitable leads and the servomotor 74 reproduces a mechanical rotation corresponding to the voltage pattern derived from the output of the Cn unit. This mechanical rotation is manifested by shaft 75, output shaft of servomotor 74. At the end of shaft 75 is fixed a bevel gear 76 in meshing engagement with a bevel gear 77 fixed to a shaft 78. The shaft 78 feeds back to the synchro control transformer 70 to supply a follow-up feature of this part of the system and, in addition, feeds to the gear train 79. The purpose of gear train 79 is to introduce into the system a speed ratio which is the reciprocal of the speed ratio described into the pick-up unit A1. In this case the speed ratio is 4 to 1 so that the final corrected totalized speed delivered from gear train 79 to register 80 is of the proper magnitude to drive a standard register such as the register used with the meters.

Referring briefly to Figure 1, it will be noted that a unit D is connected to the first C unit. The D unit is in reality a small transformer which supplies the driving signals for the synchro differentials of the C units and, as will be noted from Figure 1, the signals of the C units are added vertically until the totalized signal is fed to the E unit.

The operation of the apparatus of the present invention will now be described. Several meters are selected and arranged respectively with an A, B and C unit. The C units are connected vertically together, as previously described, and the output from the last C unit is arranged to be fed to the E unit. Considering, for simplicity, the operation of a single meter, at least to the point where the signal arrives at the C unit, the following can be said. The meter shaft turns responsive to the passage of fluid through the meter. As the meter shaft turns, it drives the synchro generator of the A unit. This produces a pattern of voltages which are fed successively through the synchro control transformer and servo amplifier of the B unit to drive the servomotor of the B unit, reproducing the mechanical motion of the fluid meter shaft. This mechanical motion is then fed through the three sets of gear trains to introduce the necessary corrections to the fluid meter shaft speed and, at the same time, the voltage pattern from the synchro generator is fed to a series of cascaded synchro differentials. The corrected meter shaft speed is compared with the pattern of voltages from the synchro generator, and finally, the output from the last synchro differential is a pattern of voltages corresponding to a corrected fluid meter shaft speed. This pattern of voltages is fed to the C unit, which receives the pattern of voltages and acts upon same to reproduce the mechanical motion corresponding to the pattern of voltages. Thus a shaft is rotated in the C unit at the corrected meter speed. This speed is then reduced by a set factor and is fed to a synchro differential unit in the C unit. The synchro differentials of the C units are added vertically in order to obtain a totalized result which appears at the output of the last C unit in the form of a pattern of voltages. This pattern is fed to the E unit, or totalizer unit, wherein it is transformed back into a mechanical shaft rotation, running at a speed reduced by the factor of the gear train in the C unit. Thus it is necessary, in order to get a true reading on the register, to multiply the register reading by the reciprocal of the speed reduction in the C unit. This factor is 10, for convenience in this case.

The standardization and calibration apparatus as well as the technique employed will now be described with reference to Figure 7. It will be recalled from previous discussion that a fluid meter must be calibrated for each type of fluid to be measured and also periodically to detect changes in meter accuracy due to wear, etc., to enable a determination of the necessary correction factor to be applied to the fluid meter in the B unit via the apparatus shown in either Figure 3 or Figure 4. As portrayed in Figure 7 the method of calibration according to the present invention is based upon a comparison of corrected meter speeds and comparing these corrected speeds to a known rate of flow of fluid.

Referring now to Figure 7 there is shown the apparatus for standardizing a master meter and for thereafter employing the standardized master meter as a means for calibrating other fluid meters. As shown a tank 100 is provided characterized by a true non-varying cross section with respect to height for use as the standard of comparison. Because the tank 100 is of non-varying cross section, the rising fluid level, as fluid is forced into the tank 100, is related to fluid flow into the tank and can be determined by this condition. For this purpose a servo followup system including a follower head 101, a servo amplifier 102 supplied with power from a suitable source by lead 103 and a servomotor 104 for driving follower head 101 by shafts 105 and 106 is provided. A small inductor alternator consisting of a pickup coil 107 and a tone wheel 108 fixed to shaft 106 is employed to convert the sensations of rate of fluid flow determined by the servo follow-up system into a corresponding frequency.

It will be appreciated that in the foregoing description fluid is forced into tank 100 through a pipe line 109 preferably at a fixed rate. Inserted in the pipe line 109 are one or more test meters M$t$ and a master meter M$m$. Connected to the meters M$t$ and M$n$ are pick-up units At and Am respectively, each including a synchro generator as was explained with reference to Figure 2. To the A units are connected meter correction factor units Bt and Bm, respectively.

The fluid flow signal response from the Bm unit is fed by lead 110 to a servo follow-up system including a synchro control transformer 111, a servo amplifier 112 supplied with power from a suitable source and a servomotor 113. The servo follow-up system drives a tone wheel 114 of a second alternator responsive to the signal output from the Bm unit and the pick-up coil 115 of the alternator converts the fluid flow signal response into a corresponding frequency.

The voltage output from coil 115 is fed through a suitable amplifier 116 and impressed on the horizontal deflection plates H of a cathode ray tube 117. The voltage output from coil 107 is fed to a contact 118 constituting one position of a two position switch 119. When the switch 119 is in the standardize position the voltage output from coil 107 passes through switch 119, through a suitable amplifier 120 and is impressed upon the vertical deflection plates V of cathode ray tube 117.

If the two frequencies from these coils 107 and 115 are equal, the figure on the cathode ray tube screen will be an ellipse. This ellipse may degenerate into two coincident straight lines if the two voltages are in-phase or 180 degrees out of phase. If the two frequencies are not equal, the ellipse will rotate and change in shape through all possible phase angles at a speed which is the difference between the two frequencies. The proper correction factor for the meter being standardized can now be determined by adjusting the meter factor device of the Bm unit until the ellipse on the cathode ray tube screen shows unappreciable movement.

After the master meter Mm has been standardized by having its speed corrected in accordance with the calibration tank 100, it can be used to calibrate other meters such as meter Mt. The fluid flow signal response from the Bt unit is fed via lead 121 to a servo follow-up system including a synchro control transformer 122, a servo amplifier 123 supplied with power from a suitable source, and a servomotor 124. The tone wheel 125 of a third alternator is driven by the servomotor 124 and the pick-up coil 126 of the alternator converts the fluid flow signal response into a corresponding frequency. The voltage output from coil 126 is brought to contact 127 constituting the second position or calibrate position of switch 119.

When it is desired to calibrate the meter Mt under test against the already standardized meter Mm all that is required is to move switch 119 into its calibrate position and adjust the dials of the meter correction factor Bt until the ellipse on the cathode ray tube screen shows unappreciable movement. Under this condition the meter Mt under test has been standardized to the master meter Mm calibration.

Although the present invention has been shown and described in a specific embodiment, nevertheless, various changes and modifications obvious to one skilled in the art are within the spirit, scope and contemplation of the present invention.

What is claimed is:

1. In combination, a fluid meter, a first shaft connected to said meter to rotate in response to operation of said meter, a synchro generator connected to said first shaft to produce an electrical signal correlated to rotation of said shaft, a meter correction factor unit connected to sample said electrical signal and including means to rotate a second shaft at the same speed as said first shaft, three synchro differentials connected in cascade fashion, a variable ratio gear train connected to the rotor of each said synchro differential for imparting a predetermined angular velocity thereto, said second shaft connected to said gear trains in parallel, and means to receive said electrical signal in said first synchro differential, and means to receive the output from said last synchro differential and indicate same.

2. The combination as recited in claim 1 wherein said gear trains impose a correction on said signal "S" in the range of 0.950S to 1.0499S.

3. In combination, a fluid meter, a first shaft connected to said meter to rotate in response to operation of said meter, a synchro generator connected to said first shaft to produce an electrical signal correlated to rotation of said shaft, a meter correction factor unit including means responsive to said electrical signal and translate same to rotate a second shaft at the same speed as said first shaft, three mechanical differentials connected in cascade fashion, a variable ratio gear train connected to one element of each said differential for imparting a predetermined angular velocity thereto, said second shaft connected to the first differential and to said gear trains in parallel, and means to receive the output from said last differential and indicate same.

4. A meter correction factor and totalizer system comprising at least two fluid meters, a shaft connected to each meter to rotate responsive to operation of said meter, a pick-up unit associated with each meter and including a synchro generator connected to the shaft of the associated meter, each said pick-up unit functioning to produce a signal corresponding to rotation of said shaft, a meter correction factor unit including synchro control transformer means associated with each said pickup unit receiving said signal therefrom and including means to impose on said signal a correction to compensate for physical characteristics of the fluid handled by said meters and inaccuracies in said meters, a totalizer unit associated with each said meter correction factor unit receiving said corrected signal therefrom and including differential means, means connecting said differential means in series to totalize said corrected signals and means receiving the totalized corrected signal and indicating same, wherein said totalizer unit includes means to reduce the value of said totalized signal by a fixed ratio and wherein said last mentioned means includes a mechanism for increasing said totalized signal by the same ratio as the totalized signal was reduced in said totalizer unit.

5. A meter correction factor and totalizer system comprising at least two fluid meters, a shaft connected to each meter to rotate responsive to operation of said meter, a pick-up unit associated with each meter and including a synchro generator connected to the shaft of the associated meter, each said pick-up unit functioning to produce a signal corresponding to rotation of said shaft, a meter correction factor unit including synchro control transformer means associated with each said pick-up unit receiving said signal therefrom and including means to impose on said signal a correction to compensate for physical characteristics of the fluid handled by said meters and inaccuracies in said meters, a totalizer unit associated with each said meter correction factor unit receiving said corrected signal therefrom and including differential means, means connecting said differential means in series to totalize said corrected signals and means receiving the totalized corrected signal and indicating same, wherein said meter correction factor unit includes three adjustable gear trains to impose a correction on said signal "S" in the range of 0.950S to 1.0499S, said correction comprising the ratio of true meter reading to actual meter rotation.

6. A meter correction factor and totalizer system comprising at least two fluid meters, a shaft connected to each meter to rotate responsive to operation of said meter, a pick-up unit associated with each meter and including a synchro generator connected to the shaft of the associated meter, each said pick-up unit functioning to produce a signal corresponding to rotation of said shaft, a meter correction factor unit including synchro control transformer means associated with each said pickup unit receiving said signal therefrom and including means to impose on said signal a correction to compensate for physical characteristics of the fluid handled by said meters and inaccuracies in said meters, a totalizer unit associated with each said meter correction factor unit receiving said corrected signal therefrom and including differential means, means connecting said differential means in series to totalizer said corrected signals and means receiving the totalized corrected signal and indicating same, wherein said synchro generator produces an electrical signal and wherein said meter correction factor unit includes means responsive to said signal to rotate a second shaft at the same speed as said shaft connected to said meter, three synchro differentials, connected in cascade fashion, a variable ratio gear train connected to the rotor of each said synchro differential to impart a predetermined angular velocity thereto said second shaft connected to said gear trains in parallel, and means to receive said electrical signal from said synchro generator in said first synchro differential.

7. A meter correction factor and totalizer system comprising at least two fluid meters, a shaft connected to each meter to rotate responsive to operation of said meter, a pick-up unit associated with each meter and including a synchro generator connected to the shaft of the associated meter, each said pick-up unit functioning to produce a signal corresponding to rotation of said shaft, a meter correction factor unit including synchro control transformer means associated with each said pickup unit receiving said signal therefrom and including means to impose on said signal a correction to compensate for physical characteristics of the fluid handled by said meters and inaccuracies in said meters, a totalizer unit associated with each said meter correction factor unit receiving said corrected signal therefrom and including differential means, means connecting said differential means in series to totalize said corrected signals and means receiving the totalized corrected signal and indicating same, wherein said meter correction factor unit includes means responsive to said signal to rotate a second shaft at the same speed as the shaft connected to said meter, three mechanical differentials connected in cascade fashion, a variable ratio gear train connected to one element of each said differential, for imparting a controllable rotational speed thereto and said second shaft connected to said first differential and to said gear trains in parallel.

References Cited in the file of this patent

UNITED STATES PATENTS

| | | |
|---|---|---|
| 1,612,117 | Hewlett et al. | Dec. 28, 1926 |
| 1,614,217 | Thompson | Jan. 11, 1927 |
| 1,996,150 | Eches et al. | Apr. 2, 1935 |
| 2,046,591 | Tornquist | July 7, 1936 |
| 2,050,800 | Lane et al. | Aug. 11, 1936 |
| 2,085,224 | Krueger | June 29, 1937 |
| 2,112,683 | Woolley | Mar. 29, 1938 |
| 2,221,943 | Fischer | Nov. 19, 1940 |
| 2,434,259 | Burton | Jan. 13, 1948 |
| 2,438,934 | Marsh | Apr. 6, 1948 |
| 2,510,327 | Bennett | June 6, 1950 |
| 2,611,191 | Noxon et al. | Sept. 23, 1952 |
| 2,725,550 | Prior | Nov. 29, 1955 |

OTHER REFERENCES

Principles of Selsyn Equipments and Their Operation, General Electric Review, vol. 33, No. 9, September 1930, pages 500–504 (501, 502) by L. F. Holder.